2,442,584

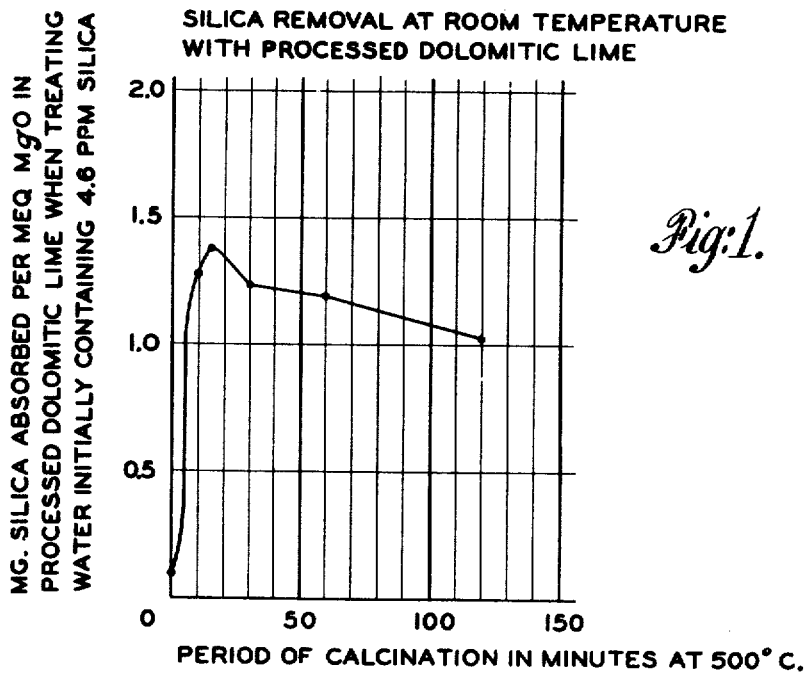
Fig. 1. — SILICA REMOVAL AT ROOM TEMPERATURE WITH PROCESSED DOLOMITIC LIME
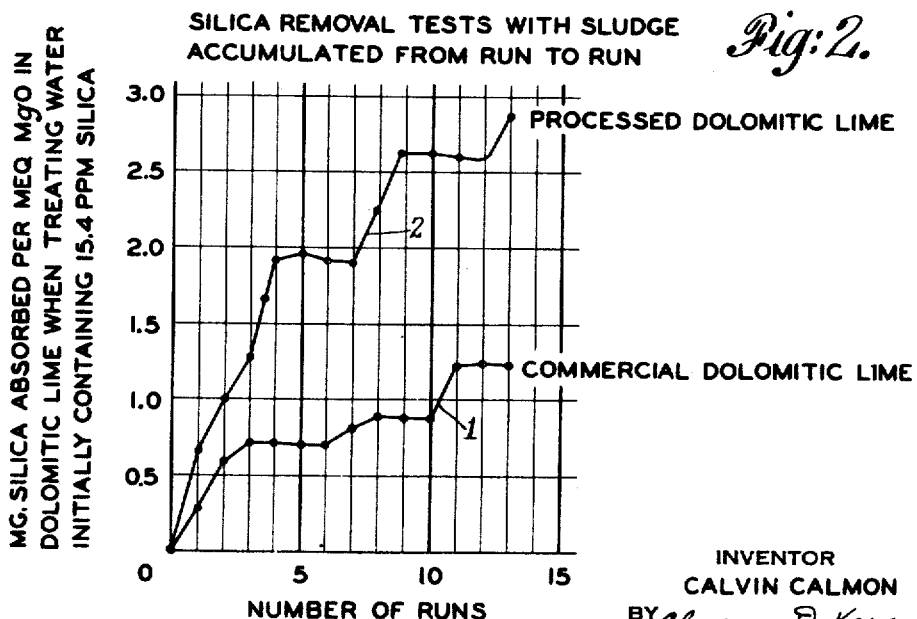
Fig. 2. — SILICA REMOVAL TESTS WITH SLUDGE ACCUMULATED FROM RUN TO RUN
INVENTOR
CALVIN CALMON
BY Clarence D. Kerr
ATTORNEY Patented June 1, 1948

UNITED STATES PATENT OFFICE 2,442,584

REMOVAL OF IMPURITIES FROM LIQUIDS BY CONTACT WITH DOLOMITIC LIME CALCINED FOR 10 TO 120 MINUTES AT A TEMPERATURE OF 300° C. TO 700° C., AND PRODUCT THEREFOR

Calvin Calmon, Mount Holly, N. J., assignor to The Permutit Company, New York, N. Y., a corporation of Delaware Application July 7, 1942, Serial No. 450,086

3 Claims. (Cl. 210—23)

1

This invention relates to the removal of impurities from materials requiring treatment with lime by the use of finely divided dolomitic materials containing magnesium compounds of high absorptive capacity, to dolomitic materials suitable for this purpose, and to the preparation of such highly absorptive materials.

The use of magnesium compounds for removing dissolved impurities such as silica and fluoride from water has been developed to the point where such processes are commercially practical. The general principles which govern the use of magnesium compounds for the removal of silica are described in a paper entitled "Silica removal by an improved magnesia process," by Howard L. Tiger, published in Journal of the A. S. M. E. in vol. 64, No. 1, pages 49–63, January, 1942. Dolomitic lime has been used successfully in this connection to remove silica and fluoride from hard water, and has the dual function of softening the water simultaneously with the removal of the dissolved impurities.

I have found that relatively inexpensive dolomitic materials containing magnesium compounds can be treated in such a manner as to increase substantially their ability or capacity for absorbing impurities, such as silica, fluoride and other materials. While ordinary dolomitic limes obtained on the market can be used with good results, the effectiveness of such a material can be increased several times by a treatment consisting essentially of calcining or heat treating the double hydrated product to drive off a portion of the moisture in it. Such a specially prepared dolomitic lime is unusually effective for absorbing impurities in chemical processes that require the use of lime.

One object of this invention, therefore, is to utilize a highly absorptive dolomitic lime for absorbing impurities in a process which normally requires the use of lime.

Another object of this invention is the provision of an improved process for removing dissolved impurities such as silica or fluoride from water by treating the water with a dolomitic material containing highly absorptive magnesium compounds.

A further object of the invention is the provision of specially prepared dolomitic materials that are much more effective than ordinary dolomitic materials for absorbing impurities.

A further object is the provision of a method of preparing dolomitic materials suitable for the foregoing purposes and containing magnesium compounds in a highly absorptive form.

2

The invention will be described in conjunction with two graphs shown in the accompanying drawings, in which Figure 1 is a graph showing the effect of different calcining periods at 500° C. upon the silica absorbing ability of double hydrated dolomitic lime.

Figure 2 is a graph comparing the abilities of a specially treated dolomitic lime and an ordinary dolomitic lime to remove silica from water during a number of successive runs.

Ordinary dolomite is usually regarded as the double carbonate of calcium and magnesium, and while dolomites vary over a considerable range in their respective proportions of calcium and magnesium, the common form of dolomite is generally expressed chemically as $CaCO_3 \cdot MgCO_3$. Ordinary dolomite is usually converted to dolomitic lime by calcining at a temperature high enough to decompose both the calcium carbonate and the magnesium carbonate, thus leaving a product which is regarded as the double oxide of calcium and magnesium and may be expressed as $CaO \cdot MgO$. When dolomitic lime is hydrated by simply placing the dead burned lime in water, the hydrate formed is represented by the formula $Ca(OH)_2 \cdot MgO$. When steam is used to hydrate the dolomitic lime, both the calcium and magnesium oxides are converted to the corresponding hydroxides, so that the double hydrated product may then be expressed as $Ca(OH)_2 \cdot Mg(OH)_2$. Dolomitic lime is regarded as fully hydrated when approximately 95% of the magnesia becomes hydrated.

I have found that the application of a controlled heat treatment to a double hydrated dolomitic lime greatly increases the ability of the product to remove impurities such as silica or fluoride from water treated with the resulting product. Of course, if too high a heat treating temperature is employed for too long a time, the material will be converted back to its original condition of substantially dead burned dolomitic lime. By using lower temperatures or shorter heat treatments, however, so that the heat treatment is stopped short of converting the hydrated dolomitic lime back to its original dead burned condition, I have found that the absorptive ability or capacity of the material is greatly increased. For most purposes, a calcining temperature of the order of 300 to 700° C. is well suited for this treatment. The time of calcination can be varied over a considerable range, but optimum results require a proper correlation of the temperature and time of treatment.

For example, when double hydrated dolomitic lime is calcined at 500° C., a product with the best silica and fluoride removing properties is obtained by a heating period lasting about 15 minutes. At lower temperatures, of course, somewhat longer heating times are necessary to produce comparable results, and at higher temperatures than 500° C. excellent results may be obtained with heating periods of less than 15 minutes.

Furthermore, longer times of heating at 500° C., or higher temperatures will produce excellent products. At 500° C., heating periods of 30 minutes, 60 minutes or even two hours produce products which are many times more effective in removing silica or fluoride from water than either ordinary dead burned, simple hydrated or fully hydrated dolomitic lime.

The effect of these different periods of heating is illustrated by the graph in Fig. 1. In this graph, the amount of silica absorbed is plotted as the ordinate against the time of heating of double dolomitic lime at 500° C. The fully hydrated dolomitic lime and the products calcined at 500° C. for 10, 15, 30, 60 and 120 minutes were each tested for their silica absorbing ability by agitating a given weight of the product with a given volume of raw water containing 4.6 P. P. M. of silica. In each case, the agitation was continued for one hour, and the treated water was analyzed for silica after a one half hour settling period. The marked superiority of the products after calcination is clearly apparent.

In Fig. 2, the cumulative effect of a calcined double hydrated dolomitic lime is compared with the cumulative effect of a commercial dolomitic lime in removing silica from water. In this graph, the silica removing capacities of the products are plotted as ordinates against the number of runs as abscissae. The data for these curves were obtained by agitating successive portions of raw hard water containing 15.4 P. P. M. of silica with given quantities of the product in question. The sludge formed was allowed to accumulate from one batch of water to the next, and the treated water from each batch was analyzed for silica. Curve Number 1 was obtained by following this procedure using commercial dolomitic lime, and curve Number 2 was obtained by using a double hydrated dolomitic lime that has been heated at 500° C. for 15 minutes.

The absorptive capacity of such calcined hydrated materials for removing fluoride from water is similarly much greater than the capacities of the fully hydrated or dead burned materials. Tests on water containing 5.2 P. P. M. of fluoride have shown that calcined double hydrated dolomitic lime calculated in this manner reduces this fluoride concentration to 1.0 P. P. M., whereas ordinary dolomitic lime used under the same conditions only lowers the fluoride content to 2.5 P. P. M., a quantity which is still high enough to render the water unhealthy for human consumption.

During the heating or calcination of the $Ca(OH)_2 \cdot Mg(OH)_2$, the material loses weight due first to the decomposition of the $Mg(OH)_2$ into $MgO$ and $H_2O$. The $Ca(OH)_2$ does not appear to decompose into $CaO$ and $H_2O$ to any great extent until after the $Mg(OH)_2$ has been substantially completely changed into $MgO$.

While better results are probably obtained by stopping the heating or calcining treatment before all of the $Mg(OH)_2$ has been dehydrated, good results are also obtained if the heat treatment is carried to the point of dehydrating all of the magnesium hydroxide and a portion of the calcium hydroxide.

My new dolomitic materials are particularly useful for removing dissolved impurities from aqueous liquids, as in the treatment of hard water where the lime operates to precipitate hardness constituents from the water and the highly absorptive magnesium oxide absorbs large amounts of impurities such as silica or fluoride dissolved in the water.

Examples of other processes in which these specially prepared dolomitic materials may be used to advantage include the final clarification step in the purification of gelatin and glues. If this is the case, the alum or phosphoric acid in solution would be coagulated by the lime in the calcined double hydrated dolomitic lime and the magnesium compounds would reduce the amount of impurities in the final product.

Also in the leather tanning industry, these new dolomitic limes may be used to lime the animal hides and reduce the frequency of preparing fresh lime baths because of the absorption of organic decomposition products and other impurities.

In the purification of sugar juices normally treated with ordinary lime, the substitution of my improved dolomitic lime may be used to assist in the removal of impurities from the sugar solution simultaneously with precipitation of the lime, thus facilitating and possibly even eliminating some of the subsequent purifying steps of the process.

In fact, these new dolomitic materials have been described particularly in connection with removal of silica and fluoride from water, but they may be used generally in the treatment of aqueous liquids where the lime is used up in some manner and the magnesium compounds serve the useful function of absorbing various impurities.

By the term "dissolved" impurities such as silica or fluoride is meant those impurities that are in true solution or are dispersed in the liquid in substantially colloidal form, as distinguished from salts in suspension.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A process of removing dissolved impurities selected from the class consisting of silica and fluorides from aqueous liquids comprising adding to the liquid a double hydrated dolomitic lime calcined for about 10 to 120 minutes at a temperature of about 300° to 700° C. and thereafter separating the liquid from solid matter mixed therewith.

2. A composition for removing dissolved impurities selected from the class consisting of silica and fluorides from an aqueous liquid said composition comprising double hydrated dolomitic lime calcined for about 10 to 120 minutes at a temperature of about 300° to 700° C.

3. A process of increasing the ability of dolomitic materials to remove impurities selected from the class consisting of silica and fluorides from aqueous liquids, said process comprising heating a double hydrated dolomitic lime for about 10 to 120 minutes at a temperature of about 300° to 700° C.

CALVIN CALMON.

REFERENCES CITED

The following references are of record in the file of this patent:

UNITED STATES PATENTS

| Number | Name | Date |
|---|---|---|
| 283,472 | Dudley | Aug. 21, 1883 |
| 705,253 | Krause | July 22, 1902 |
| 773,395 | Jones | Oct. 25, 1904 |
| 1,315,836 | Hoffman | Sept. 9, 1919 |
| 1,604,126 | Kern | Oct. 26, 1926 |
| 1,653,272 | Green et al. | Dec. 20, 1927 |
| 2,207,725 | Elvove | July 16, 1940 |
| 2,317,961 | Tschirner | Apr. 27, 1943 |

FOREIGN PATENTS

| Number | Country | Date |
|---|---|---|
| 3,730 | Great Britain | 1886 |
| 100,590 | Sweden | Nov. 7, 1940 |

OTHER REFERENCES

"Industrial and Engineering Chemistry," June, 1941, pages 817–818 cited, article entitled Dolomitic Lime, a copy of which may be found in 210—23.

Mechanical Engineering (January 1941), pages 34–35, article entitled "Silica Removal."